US009444724B2

(12) United States Patent
Yagyu

(10) Patent No.: US 9,444,724 B2
(45) Date of Patent: Sep. 13, 2016

(54) ROUTER, METHOD FOR USING CACHE WHEN CONTENT SERVER IS UNREACHABLE, AND PROGRAM

(75) Inventor: Tomohiko Yagyu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 423 days.

(21) Appl. No.: 13/976,306

(22) PCT Filed: Jan. 16, 2012

(86) PCT No.: PCT/JP2012/050675
§ 371 (c)(1),
(2), (4) Date: Jun. 26, 2013

(87) PCT Pub. No.: WO2012/099035
PCT Pub. Date: Jul. 26, 2012

(65) Prior Publication Data
US 2013/0275619 A1    Oct. 17, 2013

(30) Foreign Application Priority Data
Jan. 19, 2011    (JP) .................................. 2011-008747

(51) Int. Cl.
*G06F 15/173*    (2006.01)
*H04L 12/707*    (2013.01)
*H04L 12/703*    (2013.01)
*H04L 12/721*    (2013.01)

(52) U.S. Cl.
CPC ............... *H04L 45/22* (2013.01); *H04L 45/28* (2013.01); *H04L 45/12* (2013.01)

(58) Field of Classification Search
None
See application file for complete search history.

(56) References Cited

U.S. PATENT DOCUMENTS

| | | | | |
|---|---|---|---|---|
| 7,461,130 B1* | 12/2008 | AbdelAziz | ............ | H04W 84/20 709/208 |
| 2011/0153719 A1* | 6/2011 | Santoro | ............. | H04L 29/12066 709/203 |

FOREIGN PATENT DOCUMENTS

| | | |
|---|---|---|
| JP | 2007-183714 A | 7/2007 |
| JP | 2007-193626 A | 8/2007 |
| JP | 2007-257357 A | 10/2007 |
| JP | 2010-129036 A | 6/2010 |

OTHER PUBLICATIONS

E. Rosensweig et al., "Breadcrumbs: efficient, best-effort content location in cache networks", Proc. 2009 IEEE Infocom Mini-Conference.

(Continued)

*Primary Examiner* — Ryan Jakovac
(74) *Attorney, Agent, or Firm* — Sughrue Mion, PLLC

(57) ABSTRACT

Provided is a router to acquire a content, even when accessibility to a server is impossible due to a network failure. The router comprises: a unit for storing content data included in a content reply message transmitted from a content server; a unit for, when the content server becomes unreachable, broadcasting, to other routers, an MBC setting request message configured to set guidance information in the other routers, the guidance information being used, when a content request message which requests the content server for the content data is transmitted from a content request node, to transfer the content request message to the own router; and a unit for replying a content reply message including the stored content data, when the content request message used to request the content server for the content data is transferred in accordance with the guidance information.

9 Claims, 8 Drawing Sheets

(56) References Cited

OTHER PUBLICATIONS

Masayuki Kakida et al., "A Proposal on Active Distribution Method of In-network Induction Information in Content Distribution Networks", Proceedings of the Society Conference of IEICE 2, 2010, Aug. 31, 2010, pp. 63.

Kensuke Hashimoto et al., "Proposal of Hop-aware In-network Query Induction Scheme for Contents Cache", IEICE Technical Report, vol. 110, No. 372, Jan. 13, 2011, pp. 69-73.

International Search Report for PCT Application No. PCT/JP2012/050675 mailed on Feb. 7, 2012.

* cited by examiner

ROUTER, METHOD FOR USING CACHE WHEN CONTENT SERVER IS UNREACHABLE, AND PROGRAM

This application is a National Stage Entry of PCT/JP2012/050675 filed Jan. 16, 2012, which claims priority from Japanese Patent Application 2011-008747 filed Jan. 19, 2011, the contents of all of which are incorporated herein by reference, in their entirety.

TECHNICAL FIELD

The present invention relates to a router, a method executed in the router for using a cache when a content server is unreachable, and a program.

BACKGROUND ART

In recent years, distribution of contents (videos, books, or the like) via a network have been in progress. Currently, users who desire specific contents stored in a specific server have acquired the desired contents by acquiring the IP address of the server storing the contents through the DNS (Domain Name System) or the like and transmitting a request message to the server. However, there is a concern that a load on servers or an acquisition time may increase due to an increase in the number of contents or the number of users. In regard to a small number of specific contents (Video on Demand or Web pages of corporations, and the like), caches are provided in servers in the world by the conventional CDN (Content Delivery Network) technology, and thus load sharing among the servers and shortening of a response time are attained. However, the problem may not be resolved for transitory data (for example, sensor measurement data or the like) unfit for the CDN and may not be resolved for contents (for example, a discount coupon of a shopping center) for which it is impossible to use the CDN because of the cost.

NPL 1 discloses a Breadcrumbs (hereinafter, referred to as a BC) technology for retaining a content cache inside a network and performing guidance to the cache using a content ID in order to reduce a server load and shorten an acquisition time of all content data transmitted and received via a future network.

An operation of the BC will be described with reference to FIG. 1. In a network illustrated in FIG. 1, there are a content server 101, routers 201, 202, and 203, and user terminals 301 and 302. First, the user terminal 301 is assumed to attempt to acquire a given content A. The user terminal 301 acquires the IP address of the content server that retains a content A using a conventional system such as the DNS. Here, the IP address of the content server 101 is assumed to be acquired. The user terminal 301 transmits a content request message to the content server 101. The content request message includes an ID of a requested content. The content request message transmitted by the user terminal 301 is first received by the router 202. The router 202 transmits, to the router 201, the content request message received from the user terminal 301. The router 201 likewise transmits the content request message to the content server 101. The content server 101 receiving the content request message transmits a content reply message including the content data to the user terminal 301. The content reply message is first received by the router 201. Here, the router 201 analyzes the details of the message, stores a cache of the content data in a storage device of the router 201, and transmits the message to the router 202. Thereafter, the router 201 records the following information in a Breadcrumb table (hereinafter, referred to as a BC table) of the router 201.

[BC Information 201-1]
content ID=A
upstream node=null
downstream node=202
data passing time=2010/11/26 10:00:00
request passing time=null When there is no sufficient empty storage area in which the cache of the content data is retained in the router 201, an empty storage capacity is increased by deleting the most previously accessed content cache, and then a new content cache is stored. Even when the content cache is deleted, there is a possibility that a router having the cache is present in the downstream node direction indicated by the BC information. Therefore, the BC information is retained without change. The BC information is deleted, when a data passing time is not updated for a given time (Tf) or when a request passing time is not updated for a given time (Tq). Basically, since the capacity of the content cache that the router has is very smaller as compared to the number of all distributed contents, the caches of contents which are not downloaded many times have a tendency to be deleted relatively quickly. On the other hand, the BC information is deleted by a timer, and the timer is prolonged by arrival of a new download or request, and thus the BC information remains longer than the cache.

The router 202 receiving the content reply message from the router 201 likewise stores the cache of the content data in a storage device of the router 202 and transmits the message to the user terminal 301. Thereafter, the router 202 records the following information in a BC table of the router 202.

[BC Information 202-1]
content ID=A
upstream node=201
downstream node=null
data passing time=2010/11/26 10:00:10
request passing time=null After a given time, the cache data of the content A is assumed to be deleted from the storage device of the router 201 due to some reason such as shortage of a storage area.

Thereafter, the user terminal 302 is assumed to request the same content A. Similarly to the user terminal 301, the user terminal 302 acquires the IP address of the content server 101 of the content A using the DNS or the like and transmits a content request message. The content request message is received by the router 203 and is transmitted to the router 201. Here, the router 201 confirms whether the cache of the content ID (=A) included in the content request message is retained in the storage device of the router 201. When the cache of the content ID is not stored, the content ID is subjected to comparison with the BC information ([BC information 201-1]) recorded in the BC table of the router 201. When there is information which has the same content ID and of which the data passing time falls within a given time, the content request message is transmitted not in the direction of the content server but in the downstream node direction recorded in the BC table. Therefore, the router 201 transmits the message to the router 202. Thereafter, the router 201 rewrites the request passing time of the information ([BC information 201-1]) regarding the content A of the BC table of the router 201 into a time at which the content request message is received.

[BC Information 201-2]
content ID=A
upstream node=null
downstream node=202
data passing time=2010/11/26 10:00:00
request passing time=2010/11/26 10:04:59

The router 202 receiving the content request message confirms whether the cache of the content A is stored in the storage device of the router 202. Since the cache of the content transmitted to the user 301 is stored in the router 202, the router 202 generates a content reply message including the data of the content A and transmits the content reply message destined for the user 302 to the router 201. Thereafter, the router 202 rewrites the downstream node, the data passing time, and the request passing time of the information ([BC information 202-1]) regarding the content A of the BC table of the router 202.

[BC Information 202-2]
content ID=A
upstream node=201
downstream node=201
data passing time=2010/11/26 10:05:01
request passing time=2010/11/26 10:05:00

The router 201 receiving the content reply message from the router 202 stores the data of the content A again in the storage device of the router 201 and transmits the data of the content A to the router 203. Thereafter, the upstream node, the downstream node, and the data passing time of the information ([BC information 201-2]) regarding the content A of the BC table of the router 201 are rewritten as follows.

[BC Information 201-3]
content ID=A
upstream node=202
downstream node=203
data passing time=2010/11/26 10:05:10
request passing time=2010/11/26 10:04:59

Likewise, the router 203 also stores the cache of the content A included in the content reply message and transmits the message to the user terminal 302. Thereafter, the router 203 records the following information in the BC table of the router 203.

[BC Information 203-1]
content ID=A
upstream node=201
downstream node=null
data passing time=2010/11/26 10:05:20
request passing time=null When a content request message of the user terminal 302 is transmitted from the router 201 to the router 202 and the router 202 does not store the cache of the content A either, the router 202 likewise retrieves the information ([BC information 202-1]) regarding the content A in the BC table of the router 202. Since the downstream node is null in the information retained by the router 202, the transmission in accordance with the BC is impossible any more. Therefore, the router 202 transmits the content request message to the router 201 which is an upstream node of the information of the BC table and deletes the information regarding the content A from the BC table. The router 201 receiving the content request message from the router 202 performs comparison between the content request and the BC table of the router 201. The router 201 determines that the information regarding the BC table is already invalidated since the transmitter of the message and the downstream node of the information ([BD information 201-2]) regarding the BC table are both the router 202, and then transmits the content request message to an upstream node of the information regarding the BC table or a subsequent hop with the shortest path to the content server 101. In this case, since the upstream node of the BC information ([BC information 201-2]) retained by the router 201 is null, the router 201 transmits the content request message to the content server 101 along the shortest path to the content server 101. Thereafter, the router 201 deletes the information ([BC information 201-2]) regarding the content A of the BC table. Thus, when the content data is not already present along the path according to the BC information, the content request message can be sent to the content server 101 while the invalidated BC information is deleted.

As described above, since the router retains the cache of the content data and guides the content request message in the direction in which the content reply message has flown, the content data retained in the network can be acquired, and thus the reduction of the load on the content server and the shortening of the content acquisition time can be achieved.

CITATION LIST

Patent Literature

{PTL 1} JP-A-2007-183714

Non-Patent Literature

{NPL 1} "Breadcrumbs: efficient, best-effort content location in cache networks", by E. Rosensweig, J. Kurose, Proc. 2009 IEEE Infocom Mini-Conference

SUMMARY OF INVENTION

Technical Problem

When a network is controlled by a dynamic routing function for dynamically controlling a network path, there may be caused a case where accessibility to the content server is impossible due to a network failure, and thus each router does not have path information to the content server. As a routing protocol realizing the dynamic routing function, there are a plurality of routing protocols such as the OSPF (Open Shortest Path First) and the BGP (Border Gateway Protocol).

In the technology for guiding the request message in the network as disclosed in NPL 1, the router having no BC information which is the guidance information transmits the request message to the content server. At this time, if the router has no path to the content server, then a request message may not be transmitted to the content server resulting in that a treatment such as destruction of the request message or return of an error to a request source node is performed. Consequently, the user terminal of the request source node may not acquire the content.

Since an object of the technology disclosed in PTL 1 is to transfer data in real time, previous data may not be transferred using the cached data. The paragraph 0024 of PTL 1 describes that a relay server accumulates received data as a cache, but how to use the cashed data is not described. Further, when a path failure occurs, guidance to the cached data is not performed.

An object of the invention is to provide a router and a cache using method of enabling a content request node to acquire a content, even when accessibility to a server is impossible due to a network failure.

Solution to Problem

According to a first aspect of the prevent invention, there is provided a router including: means for storing content data included in a content reply message transmitted from a content server; means for, when the content server becomes unreachable, broadcasting, to other routers, an MBC setting request message configured to set guidance information in the other routers, the guidance information being used, when a content request message which requests the content server for the content data is transmitted from a content request node, to transfer the content request message to the own router; and means for replying a content reply message including the stored content data, when the content request message used to request the content server for the content data is transferred in accordance with the guidance information.

According to a second aspect of the prevent invention, there is provided a cache using method when a content server is unreachable, comprising steps of:

storing, as a cache, content data included in a content reply message transmitted from a content server;

when the content server becomes unreachable, broadcasting, to other routers, an MBC setting request message configured to set guidance information in the other routers, the guidance information being used, when a content request message which requests the content server for the content data is transmitted from a content request node, to transfer the content request message to the own router; and replying a content reply message including the stored content data, when the content request message used to request the content server for the content data is transferred in accordance with the guidance information.

According to a third aspect of the prevent invention, there is provided a program causing a computer to function as a router comprising: means for storing content data included in a content reply message transmitted from a content server; means for, when the content server becomes unreachable, broadcasting, to other routers, an MBC setting request message configured to set guidance information in the other routers, the guidance information being used, when a content request message which requests the content server for the content data is transmitted from a content request node, to transfer the content request message to the own router; and means for replying a content reply message including the stored content data, when the content request message used to request the content server for the content data is transferred in accordance with the guidance information.

Advantages Effects of the Invention

According to the invention, the content request node can acquire a content, even when accessibility to a server is impossible due to a network failure.

REFERENCE SIGNS LIST

111: content server
211 to 214: router
311, 312: content request node

DESCRIPTION OF EMBODIMENTS

Hereinafter, an embodiment of the invention will be described in detail with reference to the drawings.

Figure 1:
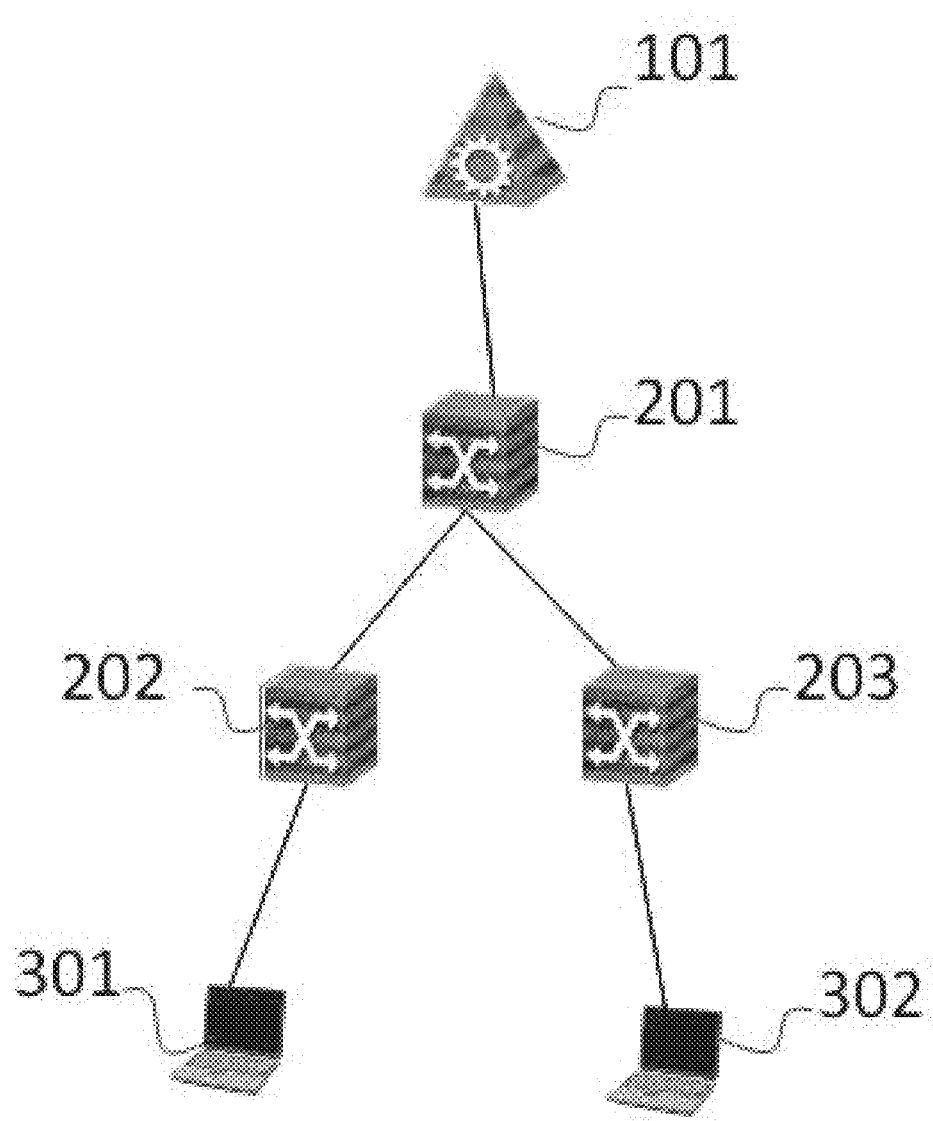
FIG. 1 is a figure illustrating an example of a normal network configuration.
Figure 2:
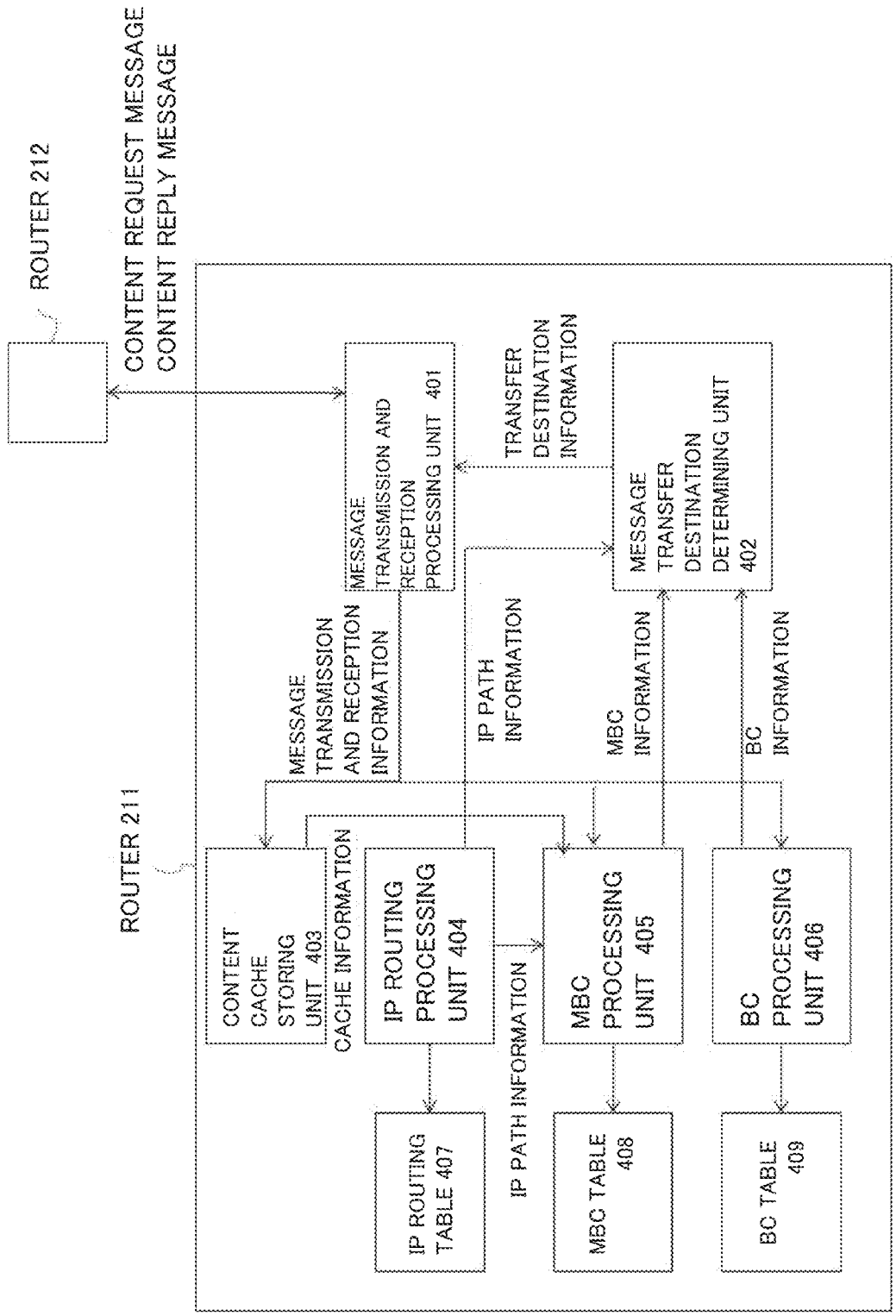
FIG. 2 is a figure illustrating a functional configuration of a router according to an embodiment of the present invention.

As illustrated in FIG. 2, a router according to this embodiment includes a message transmission and reception processing unit 401, a message transfer destination determining unit 402, a content cache storing unit 403, an IP routing processing unit 404, an MBC processing unit 405, a BC processing unit 406, an IP routing table 407, an MBC (Modest Breadcrumb) table 408, and a BC table 409.

The message transmission and reception processing unit 401 exchanges a request message, a reply message, and an MBC setting request message with an adjacent router, a content server, and a content request node and notifies the content cache storing unit 403, the MBC processing unit 405, and the BC processing unit 406 of information regarding the transmitted and received messages. When the messages are transmitted, the messages are transmitted based on transfer destination information of the message transfer destination determining unit 402.

The content cache storing unit 403 caches content data included in reception information regarding the reply message acquired from the message transmission and reception processing unit 401. When an empty storage area is insufficient, a content of which an access time is the oldest and an MBC is not distributed is deleted to increase an empty recording area.

The IP routing processing unit 404 calculates the shortest path on an IP network based on a routing protocol such as the OSPF and records the shortest path in the IP routing table 407.

The message transfer destination determining unit 402 acquires IP path information, MBC information, and BC information from the IP routing processing unit 404, the MBC processing unit 405, and the BC processing unit 406, respectively, determines a transfer destination of the request message or the reply message to be transmitted depending on a situation, and notifies the message transmission and reception processing unit 401 of the transfer destination.

The MBC processing unit 405 acquires the IP path information from the IP routing processing unit 404 and always checks accessibility of a path to the content server having the original version of the content which is cached by the own router. The cache situation is acquired from the content cache storing unit 403. At the time when the accessibility to the content server having the content of which the cache is owned by the router is impossible, an MBC setting request message is generated and is distributed to adjacent routers via the message transmission and reception processing unit 401. The MBC processing unit 405 receiving the MBC setting request message via the message transmission and reception processing unit 401 records the MBC information in the MBC table 408.

The BC processing unit 406 generates BC information based on reply message reception information received from the message transmission and reception processing unit 401 and records the BC information in the BC table 409. The BC information present in the BC table 409 is updated based on the request message reception information received from the message transmission and reception processing unit 401.

Next, an operation of the invention will be described with reference to FIGS. 3 to 8.

Figure 3:
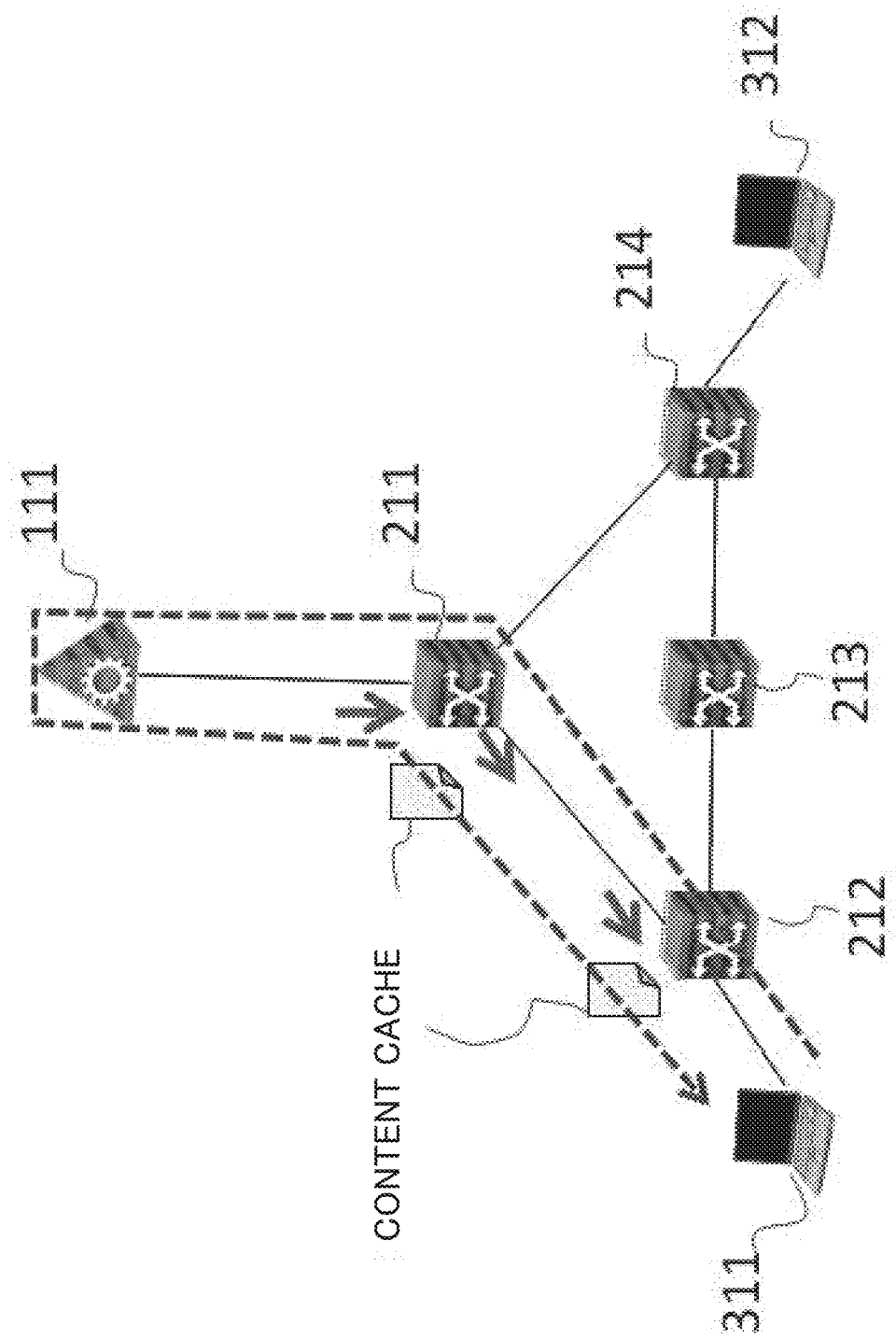
FIG. 3 is a first part out of six parts of a figure illustrating an operation sequence according to the embodiment of the present invention.

As illustrated in FIG. 3, a network includes a content server 111, routers 211 to 214, and a content request nodes 311 and 312. Paths of the network are assumed to be dynamically controlled using a routing protocol such as the OSPF (Open Shortest Path First).

In FIG. 3, the content request node 311 transmits a content request message destined for the content server 111 that owns a content B to acquire the content B. The routers 212 and 211 transmit the content request message to the content server 111 along the shortest path generated by the OSPF, as indicated by a dotted line arrow. The content server 111 receiving the content request message generates a content reply message including data of the requested content B and replies to the content request node 311. The routers 211 and 212 transfer the content reply message. When the content reply message is transferred, the routers 211 and 212 cache the content data included in the content reply message and record BC information which is transfer information including a reception direction (indicated by an upstream node) and a transfer direction (indicated by a downstream node) of the content reply message and a reception time as follows (in the drawing, a solid line arrow).

Figure 4:
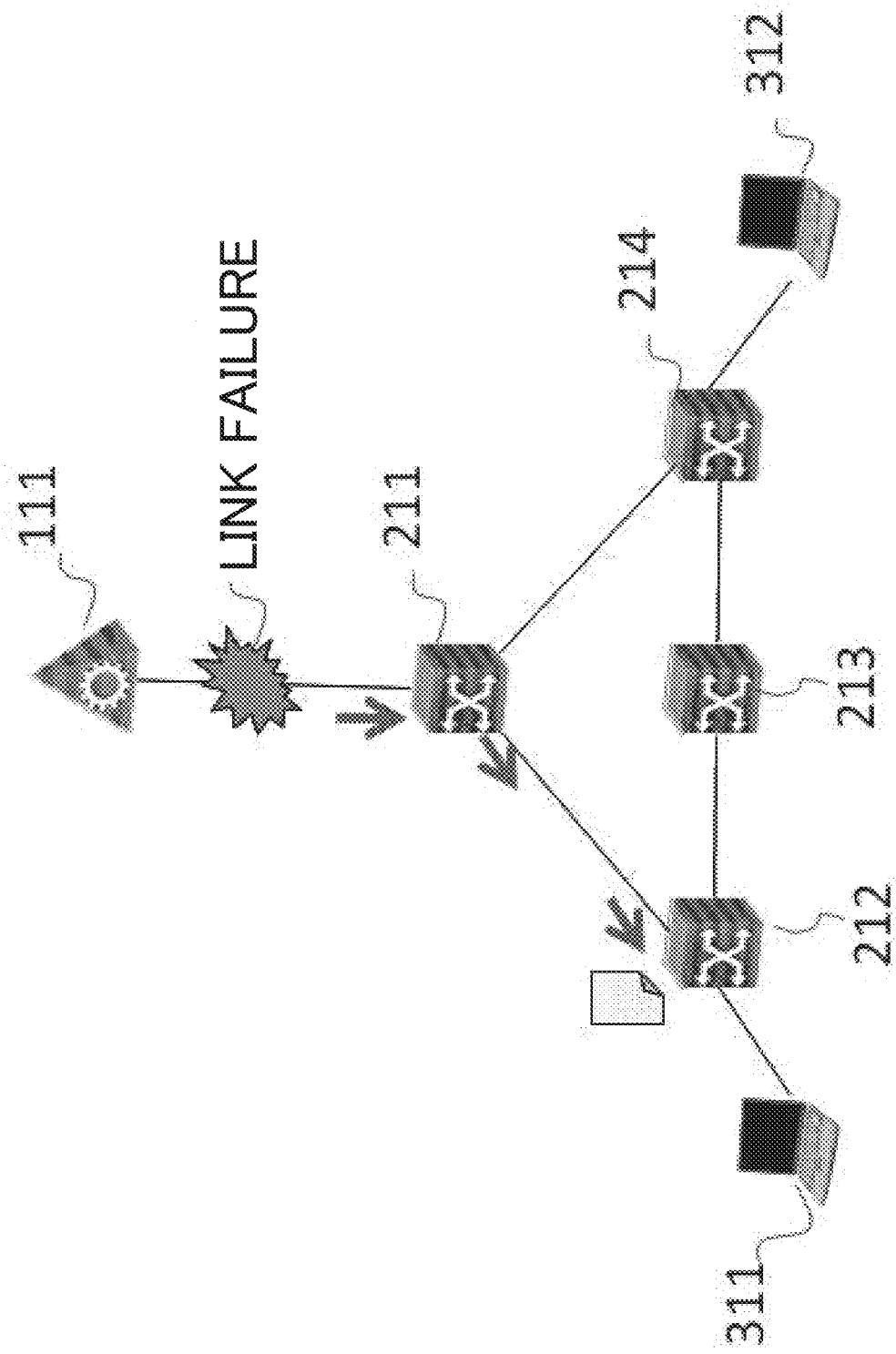
FIG. 4 is a second part out of six parts of a figure illustrating an operation sequence according to the embodiment of the present invention.

[BC Information 211-1]
content ID=B
upstream node=null
downstream node=212
data passing time=2010/11/30 14:50:20
request passing time=null
[BC Information 212-1]
content ID=B
upstream node=211
downstream node=null
data passing time=2010/11/30 14:50:30
request passing time=null Thereafter, the router 211 deletes the cache of the content B to cache another content data. Further, the link between the content server 111 and the router 211 fails, the path to the content server 111 is deleted in the routers 211 to 214, and accessibility to the content server 111 is impossible (FIG. 4).

Here, the router 212 detecting the deletion of the path to the content server 111 broadcasts a Modest Breadcrumb setting request message (hereinafter, referred to as an MBC setting request message) to all of the adjacent routers of the router 212. The adjacent routers receiving the MBC setting request message transfer the MBC setting request message to the adjacent routers of the own routers. The MBC setting request message includes the following information.

content ID
number of hops
TTL

Here, the number of hops indicates the number of hops from the sender (router 212) of the original of the MBC setting request message, and one is added at each time of the transfer. As TTL, a value indicating the upper limit number of transfers. The MBC setting request message is not transferred any more, when the number of hops reaches TTL.

Figure 5:
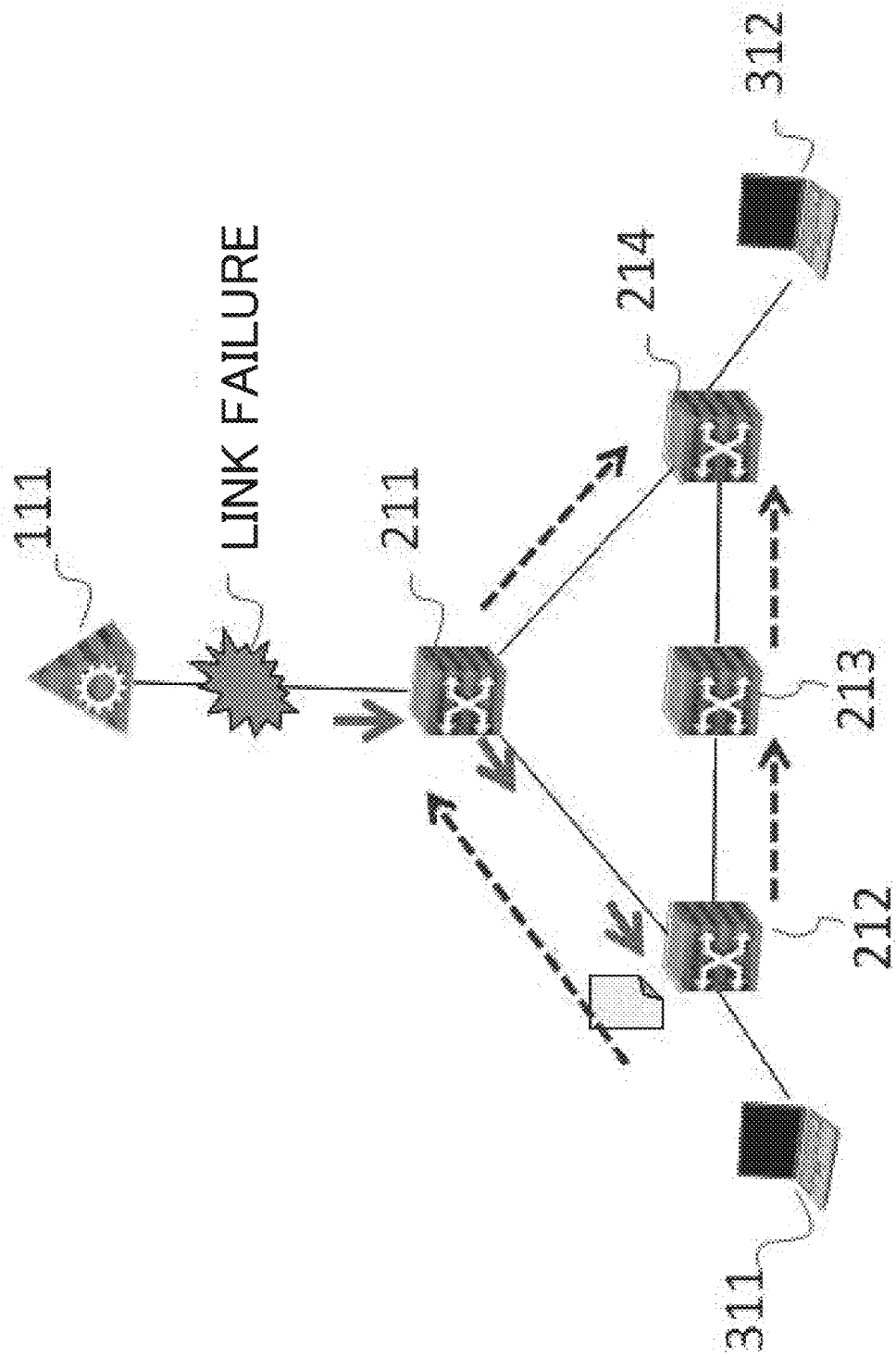
FIG. 5 is a third part out of six parts of a figure illustrating an operation sequence according to the embodiment of the present invention.

The router first receiving the MBC setting request message records the MBC information in the MBC table of the own router. In the example of FIG. 5, as indicated by dotted line arrows, the router 212 transmits the MBC setting information to the routers 213 and 211 and the routers 213 and 211 perform the transfer. The router 214 receives the MBC setting request message from both the routers 213 and 211.

For example, the router 213 records the following Modest Breadcrumbs information (hereinafter, referred to as MBC information) in the MBC table.

[MBC Information 213-1]
content ID=B
number of hops=1
downstream node=212
registration time=2010/11/30 14:25:33

The router 211 records the following MBC information in the MBC table.

[MBC Information 211-1]
content ID=B
number of hops=1
downstream node=212
registration time=2010/11/30 14:25:35

Here, the router 211 has retained the BC information generated since the content request node 311 downloaded the content B. In this case, the BC information is used with a priority higher than that of the MBC information.

The router 214 receives the MBC setting request message from both the routers 213 and 211. For example, the router 214 first receives the MBC setting request message from the router 213 and later receives the MBC setting request message from the router 211. When the router 214 first receives the MBC setting request message from the router 213, the router 214 records the following MBC information in the MBC table.

[BC Information 214-1]
content ID=B
number of hops=2
downstream node=213
registration time=2010/11/30 14:25:46

Thereafter, when the router 214 receives the MBC setting request message from the router 211, the router 214 compares the number of hops of the recorded [MBC information 214-1] and the number of hops set in the received MBC setting request message. When the number of hops set in the MBC setting request message is smaller than the number of hops recorded in the table, the information of the MBC table is rewritten so as to match the details of the MBC setting request message. Otherwise, the message is destroyed. By doing so, the MBC information can be recorded so as to match the MBC setting request message in which the number of hops is the minimum.

Figure 6:
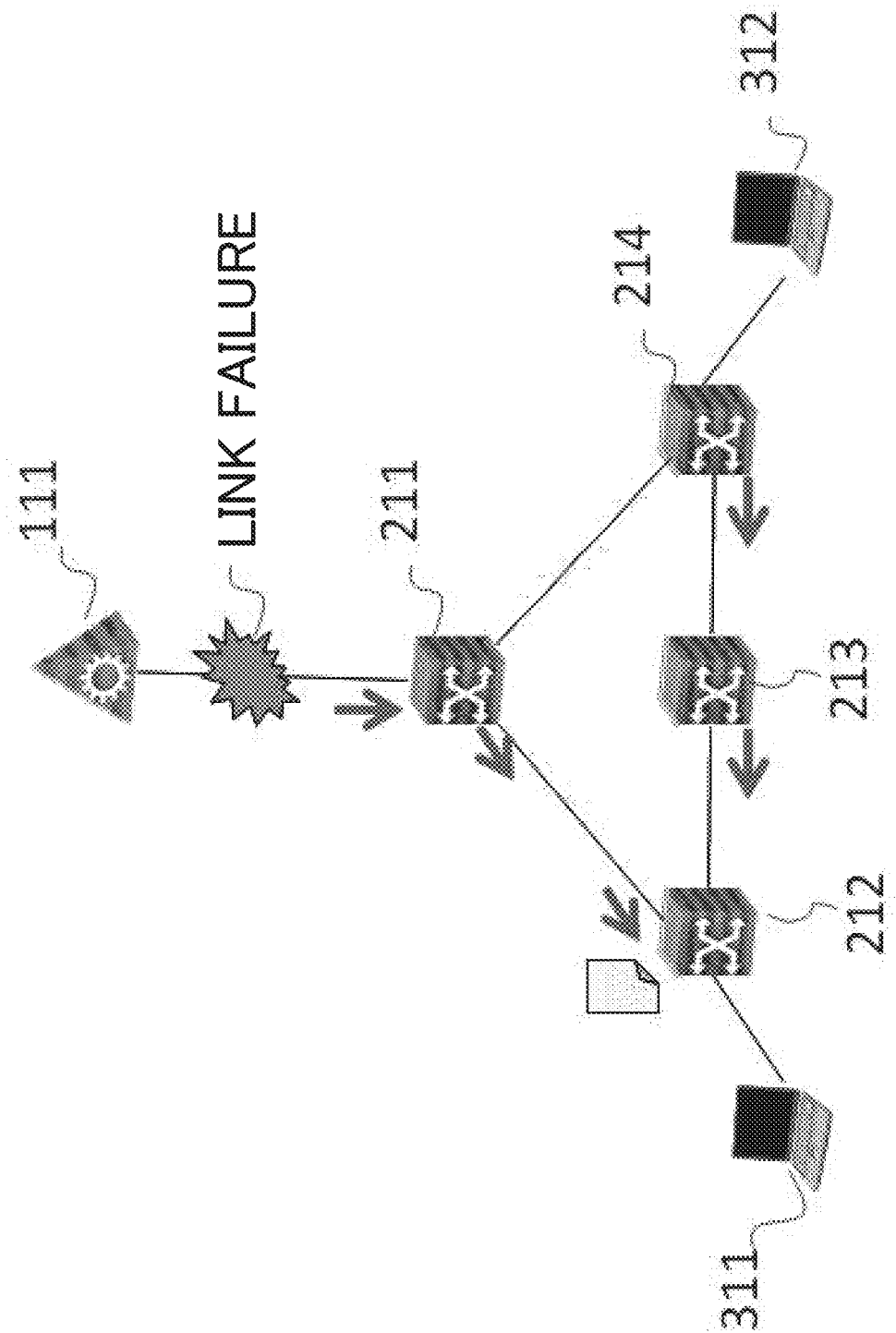
FIG. 6 is a fourth part out of six parts of a figure illustrating an operation sequence according to the embodiment of the present invention.

Thus, the path performing guidance to the cache based on the BC information and the MBC information is set, as indicated by solid line arrows of FIG. 6.

Figure 7:
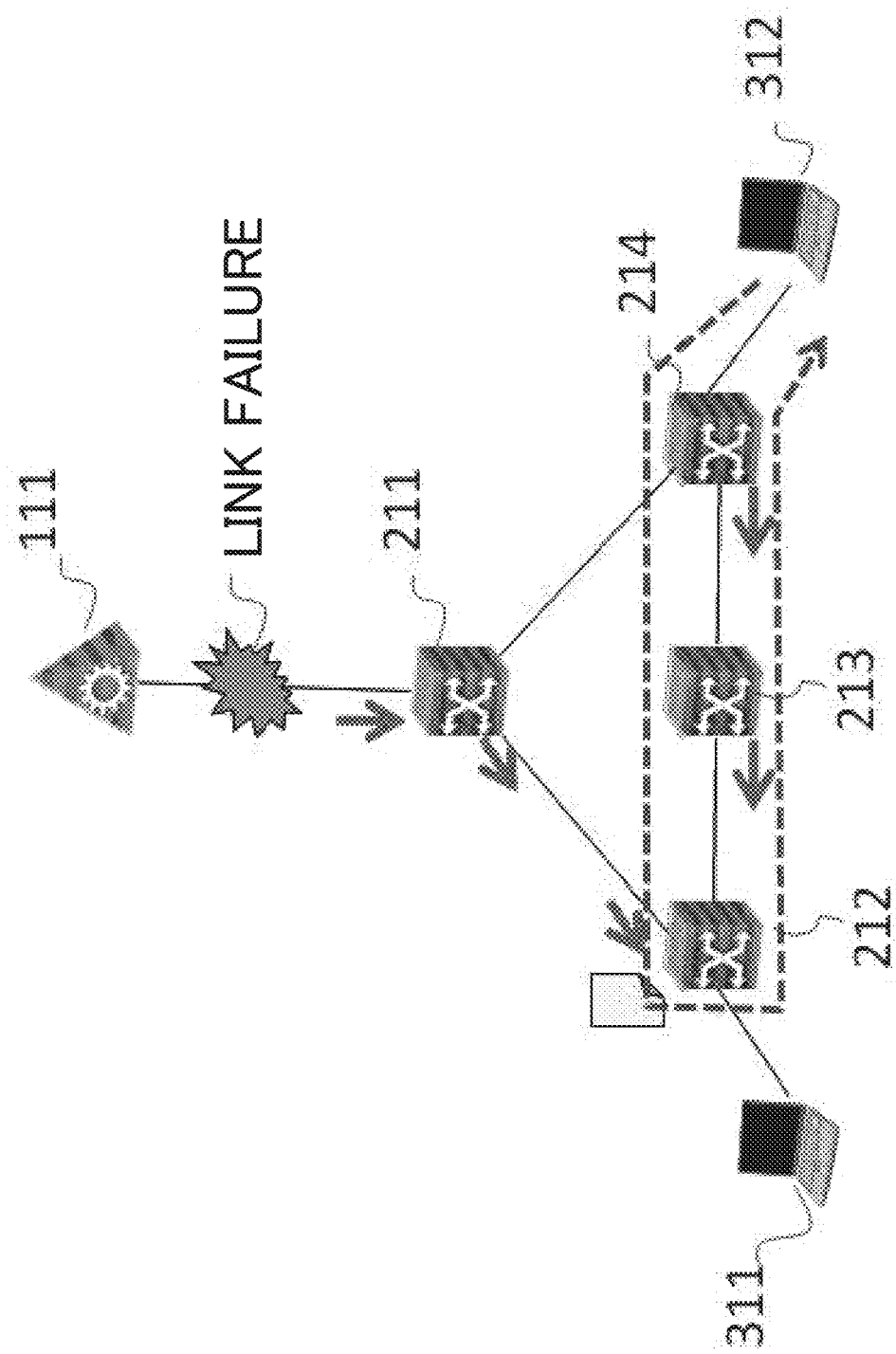
FIG. 7 is a fifth part out of six parts of a figure illustrating an operation sequence according to the embodiment of the present invention.

Next, in FIG. 7, the content request node 312 requests the content B and transmits a content request message to the router 214. Since the router 214 has no BC information nor path to the content server, the router 214 transfers the content request message to the router 213 according to the MBC information. Likewise, the router 213 also transfers the content request message to the router 212 according to the MBC information.

Figure 8:
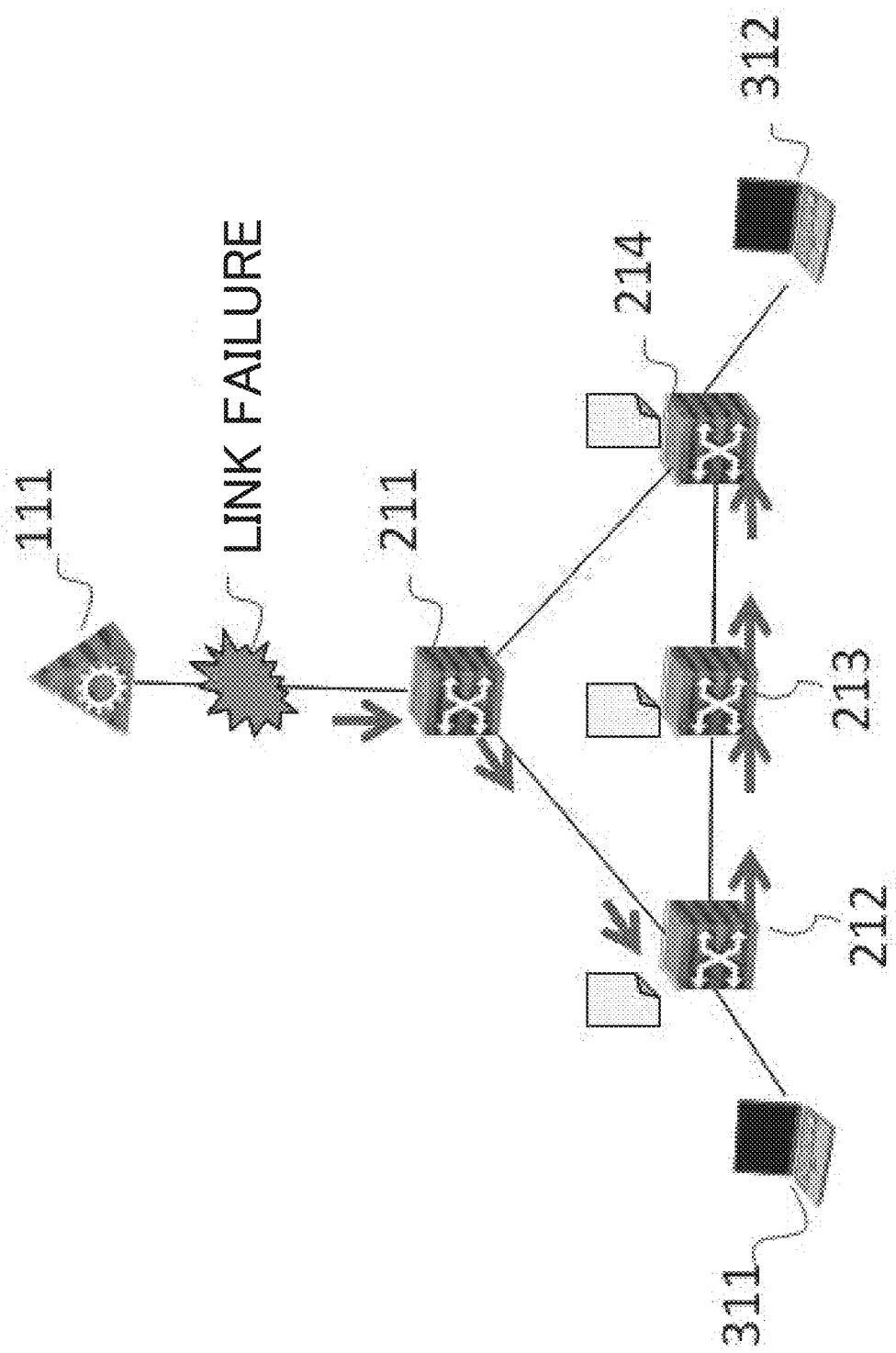
FIG. 8 is a sixth part out of six parts of a figure illustrating an operation sequence according to the embodiment of the present invention.

The router 212 receiving the content request message originated from the content request node 312 generates a content reply message including data of the content B using the cache owned by the router 212 and transmits the content reply message destined to the content request node 312. When the content reply message is transferred, pieces of the following BC information are generated in the routers 213 and 214, respectively, and the content data is cached in the routers 213 and 214 (FIG. 8).

[BC Information 213-1]
content ID=B
upstream node=212
downstream node=214
data passing time=2010/11/30 15:00:10
request passing time=null
[BC Information 214-1]
content ID=B
upstream node=213
downstream node=null
data passing time=2010/11/30 15:00:20
request passing time=null The pieces of the created MBC information are deleted when a timer indicates that a given time has passed since the creation.

The priority of the MBC information is lower than those of the normal BC information and IP path information to the content server. Therefore, when the network failure is recovered and the accessibility to the content server becomes possible after distribution of the MBC setting request message, the path to the content server is selected as the transfer destination of the content request message with a higher priority than that of the remaining MBC information.

Until the path to the content server is recovered, the router 212 having distributed the MBC information does not delete the cache corresponding to the content in the content server, so that the cache corresponding to the content in the content server remains with a higher priority.

The routers 213 and 214 which acquire the cache of the content after the distribution of the MBC information do not distribute the MBC setting request message.

Even when the accessibility to the content server is impossible due to a network failure, the router having the cache of the content distributes the MBC information, and thus the other routers can guide the content request message in the cache direction. Therefore, the content request node can acquire the content.

Each unit of the router illustrated in FIG. 2 can be realized by hardware and can be also realized by software.

A method performed by each unit of the router illustrated in FIG. 2 can be realized by hardware and can be also realized by software.

The realization of the functional unit by the software means realization by causing a computer to read a program used to cause the computer to function as the functional unit and executing the program.

The realization of the method by the software means realization by causing a computer to read a program used to cause the computer to perform the method and executing the program. The program can be stored using non-transitory computer-readable media of various types and can be supplied to a computer. The non-transitory computer-readable media include tangible storage media of various types. Examples of the non-transitory computer-readable medium include a magnetic recording medium (for example, a flexible disk, a magnetic tape, and a hard disk drive), a magneto-optical recording medium (for example, a magneto-optical disk), a CD-ROM (Read-Only Memory), a CD-R, a CD-R/W, and a semiconductor memory (for example, a mask ROM, a PROM (Programmable ROM), an EPROM (Erasable PROM), a flash ROM, and a RAM (Random Access Memory)). The program may be supplied to a computer by transitory computer-readable media of various types. Examples of the transitory computer-readable medium include an electric signal, an optical signal, and an electromagnetic wave. The transitory computer-readable medium can supply the program to a computer via a wired communication path such as a wiring or an optical fiber or a wireless communication path.

The present specification is based on Japanese Patent Application No. 2011-008747 (filed Jan. 19, 2011) and claims priority of Paris Convention on Japanese Patent Application No. 2011-008747. Priority is claimed on Japanese Patent Application No. 2011-008747, the content of which is incorporated herein by reference.

The representative embodiment of the present invention has been described in detail, but it should, of course, be understood that various changes, substitutions, and alternatives are made within the spirit and the scope of the invention defined in the claims without departing from the gist of the invention. Even when the claims are corrected in the application procedure, the inventors intend that the scope equivalent to the claimed invention is to be maintained.

A part or all of the above-described embodiments can be described as the following Notes, but the invention is not limited thereto.

(Note 1) A router comprising:
means for storing content data included in a content reply message transmitted from a content server;
means for, when the content server becomes unreachable, broadcasting, to other routers, an MBC setting request message configured to set guidance information in the other routers, the guidance information being used, when a content request message which requests the content server for the content data is transmitted from a content request node, to transfer the content request message to the own router; and
means for replying a content reply message including the stored content data, when the content request message used to request the content server for the content data is transferred in accordance with the guidance information.

(Note 2) The router according to claim 1, further comprising:
means for setting the guidance information in the own router and transferring the MBC setting request message to another router, when the MBC setting request message is received.

(Note 3) The router according to claim 1 or 2, wherein, when the MBC setting request message is received from a plurality of routers, the guidance information is set in the own router based on the MBC setting request message in which the number of hops is minimum.

(Note 4) The router according to any one of claims 1 to 3, wherein a broadcasting range of the MBC setting request message is a range of a predetermined number of hops.

(Note 5) The router according to any one of claims 1 to 4, wherein the content data stored in the own router is retained at least until an access pass to the content server recovers.

(Note 6) The router according to any one of claims 1 to 5, wherein the MBC setting request message includes a content ID, the number of hops, and the upper limit number of transfers.

(Note 7) The router according to any one of claims 1 to 6, wherein the guidance information includes a content ID, the number of hops, a downstream node, and a registration time.

(Note 8) A cache using method when a content server is unreachable, comprising steps of:

storing, as a cache, content data included in a content reply message transmitted from a content server;

when the content server becomes unreachable, broadcasting, to other routers, an MBC setting request message configured to set guidance information in the other routers, the guidance information being used, when a content request message which requests the content server for the content data is transmitted from a content request node, to transfer the content request message to the own router; and replying a content reply message including the stored content data, when the content request message used to request the content server for the content data is transferred in accordance with the guidance information.

(Note 9) The cache using method described in Note 8, further comprising: means for setting the guidance information in the own router and transferring the MBC setting request message to another router, when the MBC setting request message is received.

(Note 10) In the cache using method described in Note 8 or 9, wherein, when the MBC setting request message is received from a plurality of routers, the guidance information is set in the own router based on the MBC setting request message in which the number of hops is minimum.

(Note 11) In the cache using method described in any one of Notes 8 to 10, wherein a broadcasting range of the MBC setting request message is a range of a predetermined number of hops.

(Note 12) In the cache using method described in any one of Notes 8 to 11, wherein the content data stored in the own router is retained at least until an access pass to the content server recovers.

(Note 13) In the cache using method described in any one of Notes 8 to 12, wherein the MBC setting request message includes a content ID, the number of hops, and the upper limit number of transfers.

(Note 14) In the cache using method described in any one of Notes 8 to 13, wherein the guidance information includes a content ID, the number of hops, a downstream node, and a registration time.

(Note 15) A program causing a computer to function as a router comprising:

means for storing content data included in a content reply message transmitted from a content server;

means for, when the content server becomes unreachable, broadcasting, to other routers, an MBC setting request message configured to set guidance information in the other routers, the guidance information being used, when a content request message which requests the content server for the content data is transmitted from a content request node, to transfer the content request message to the own router; and means for replying a content reply message including the stored content data, when the content request message used to request the content server for the content data is transferred in accordance with the guidance information.

(Note 16) The router according to Note 15, further comprising:

means for setting the guidance information in the own router and transferring the MBC setting request message to another router, when the MBC setting request message is received.

(Note 17) The router according to Note 15 or 16, wherein, when the MBC setting request message is received from a plurality of routers, the guidance information is set in the own router based on the MBC setting request message in which the number of hops is minimum.

(Note 18) The router according to any one of Note 15 to 17, wherein a broadcasting range of the MBC setting request message is a range of a predetermined number of hops.

(Note 19) The router according to any one of Note 15 to 18, wherein the content data stored in the own router is retained at least until an access pass to the content server recovers.

(Note 20) The router according to any one of Note 15 to 19, wherein the MBC setting request message includes a content ID, the number of hops, and the upper limit number of transfers.

(Note 21) The router according to any one of Note 15 to 20, wherein the guidance information includes a content ID, the number of hops, a downstream node, and a registration time.

The invention claimed is:

1. A system for accessing a content, comprising:
a content server for storing a content data;
a first router for storing the content data included in a content reply message transmitted from the content server;
a plurality of second routers; and
a content request node for transmitting a content request message for requesting the content data,
the first router checking whether an access to the content server is possible or not and broadcasting an MBC setting request message to the plurality of second routers in a case where the access is impossible, the MBC setting request message being information for setting guidance information to the plurality of second routers, the guidance information being used for transferring the content request message to the first router,
at least one of the plurality of second routers transferring the content request message to the first router in a case where the at least one of the plurality of second routers that the guidance information is set receives the content request message,
the first router replying a content reply message including the content data which is stored in the first router, in a case of receiving the content request message from the at least one of the plurality of second routers,
in a case of receiving the MBC setting request message, each of the plurality of second routers setting the guidance information, and transferring the MBC setting request message to an adjacent second router in a case where the adjacent second router exists, the adjacent second router being included in the plurality of second routers.

2. The system according to claim 1, wherein, a second router that receives MBC setting request messages from a plurality of adjacent second routers sets the guidance information on the basis of one of the MBC setting request messages, the one of the MBC setting request messages being a MBC setting request message in which the number of hops is minimum, the second router and the plurality of adjacent second routers being included in the plurality of second routers.

3. The system according to claim 1, wherein a broadcasting range of the MBC setting request message is a range of a predetermined number of hops.

4. The system according to claim 1, wherein the content data stored in the first router is retained at least until an access pass to the content server recovers.

5. The system according to claim 1, wherein the MBC setting request message includes a content ID, a number of hops, and an upper limit number of transfers.

6. The system according to claim 1, wherein the guidance information includes a content ID, a number of hops, a downstream node, and a registration time.

7. A method of a system for accessing a content, comprising the steps of:
- causing a first router to store a content data included in a content reply message transmitted from a content server;
- causing a content request node to transmit a content request message for requesting the content data;
- causing the first router to check whether an access to the content server is possible or not, and broadcast an MBC setting request message to a plurality of second routers in a case where the access is impossible, the MBC setting request message being information for setting guidance information to the plurality of second routers, the guidance information being used for transferring the content request message to the first router;
- causing at least one of the plurality of second routers to transfer the content request message to the first router in a case where the at least one of the plurality of second routers that the guidance information is set receives the content request message; and
- causing the first router to reply a content reply message including the content data which is stored in the first router, in a case of receiving the content request message from the at least one of the plurality of second routers,
- in a case of receiving the MBC setting request message, each of the plurality of second routers setting the guidance information, and transferring the MBC setting request message to an adjacent second router in a case where the adjacent second router exists, the adjacent second router being included in the plurality of second routers.

8. A cache using method of a router when an access to a content server is impossible, comprising steps of:
- storing, as a cache, content data included in a content reply message transmitted from the content server;
- checking whether the access to the content server is possible or not;
- broadcasting an MBC setting request message to other routers in a case where the access is impossible, the MBC setting request message being information for setting guidance information to the other routers, the guidance information being used for transferring a content request message to the router, and
- replying a content reply message including the content data which are stored in the router, in a case of receiving the content request message from at least one of the other routers,
- in a case of receiving the MBC setting request message, each of the other routers setting the guidance information, and transferring the MBC setting request message to an adjacent other router in a case where the adjacent other router exists, the adjacent other router being included in the other routers.

9. A non-transitory computer-readable medium on which recorded is a program causing a computer as a router to execute steps of:
- storing, as a cache, content data included in a content reply message transmitted from a content server;
- checking whether an access to the content server is possible or not;
- broadcasting an MBC setting request message to other routers in a case where the access is impossible, the MBC setting request message being information for setting guidance information to the other routers, the guidance information being used for transferring a content request message to the router, and
- replying a content reply message including the content data which are stored in the router, in a case of receiving the content request message from at least one of the other routers,
- in a case of receiving the MBC setting request message, each of the other routers setting the guidance information, and transferring the MBC setting request message to an adjacent other router in a case where the adjacent other router exists, the adjacent other router being included in the other routers.

* * * * *